(12) United States Patent
Wang et al.

(10) Patent No.: US 10,503,729 B2
(45) Date of Patent: Dec. 10, 2019

(54) PROCESSING METHOD AND DEVICE OF THE USER INPUT INFORMATION

(71) Applicant: Tencent Technology (Shenzhen) Company Limited, Shenzhen (CN)

(72) Inventors: Fei Wang, Shenzhen (CN); Hao Xu, Shenzhen (CN); Pan Zhu, Shenzhen (CN); Guiping Han, Shenzhen (CN); Ling Liao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 1144 days.

(21) Appl. No.: 14/228,149

(22) Filed: Mar. 27, 2014

(65) Prior Publication Data

US 2014/0379738 A1 Dec. 25, 2014

Related U.S. Application Data

(63) Continuation of application No. PCT/CN2013/091197, filed on Dec. 31, 2013.

(30) Foreign Application Priority Data

Jun. 20, 2013 (CN) .......................... 2013 1 0246467

(51) Int. Cl.
*G06F 7/00* (2006.01)
*G06F 16/24* (2019.01)
(Continued)

(52) U.S. Cl.
CPC .......... *G06F 16/24* (2019.01); *G06F 16/3344* (2019.01); *G06F 16/3329* (2019.01)

(58) Field of Classification Search
CPC .................................................. G06F 16/3329
(Continued)

(56) References Cited

U.S. PATENT DOCUMENTS 5,640,554 A * 6/1997 Take .......................... G06F 7/36
6,339,775 B1 * 1/2002 Zamanian ............. G06F 16/254
(Continued)

FOREIGN PATENT DOCUMENTS

CN 101360088 A 2/2009
CN 102982344 A 3/2013
(Continued)

OTHER PUBLICATIONS

Tencent Technology, ISRWO, PCT/CN2013/091197, dated Mar. 27, 2014, 6 pgs.
(Continued)

*Primary Examiner* — Eliyah S. Harper
(74) *Attorney, Agent, or Firm* — Morgan, Lewis & Bockius LLP

(57) ABSTRACT

A method and device for processing user input, including: storing a respective usage rule for processing a user request for a task, the respective usage rule comprising a respective rule string, a respective command index number, and a respective parameter string; performing a first transformation on the respective rule string of the respective usage rule to obtain a respective regular expression pattern; performing a second transformation on the respective rule string of the respective usage rule to obtain a respective standard regular expression; obtaining a user input that matches the respective rule string of the respective usage rule; obtaining a concatenated parameter string using the respective regular expression pattern and the respective standard regular
(Continued)

expression; and executing a command corresponding to the respective command index number using the concatenated parameter string.

18 Claims, 5 Drawing Sheets

(51) Int. Cl.
*G06F 16/33* (2019.01)
*G06F 16/332* (2019.01)

(58) Field of Classification Search
USPC .................................................. 707/786, 736
See application file for complete search history.

(56) References Cited

U.S. PATENT DOCUMENTS

| | | | | |
|---|---|---|---|---|
| 6,519,578 | B1* | 2/2003 | Reddy | G06N 5/022 |
| | | | | 706/45 |
| 7,225,199 | B1* | 5/2007 | Green | G06F 17/2785 |
| 7,624,020 | B2* | 11/2009 | Yamada | G06F 17/2809 |
| | | | | 704/237 |
| 7,698,131 | B2* | 4/2010 | Bennett | G06F 17/2775 |
| | | | | 704/215 |
| 8,775,442 | B2* | 7/2014 | Moore | G06F 17/2785 |
| | | | | 707/749 |
| 8,812,294 | B2* | 8/2014 | Kalb | G06F 17/2881 |
| | | | | 379/88.05 |
| 8,996,376 | B2* | 3/2015 | Fleizach | G10L 13/043 |
| | | | | 704/260 |
| 9,075,792 | B2* | 7/2015 | Dai | G06F 17/2755 |
| 9,805,718 | B2* | 10/2017 | Ayan | H04M 3/4936 |
| 2002/0040359 | A1* | 4/2002 | Green | G06F 17/2785 |
| 2004/0230597 | A1* | 11/2004 | Wookey | G06F 11/008 |
| 2008/0104037 | A1* | 5/2008 | Bierner | G06F 17/3064 |
| 2008/0177726 | A1* | 7/2008 | Forbes | G06Q 30/02 |
| 2009/0019003 | A1* | 1/2009 | Bohannon | G06Q 30/02 |
| 2009/0240487 | A1* | 9/2009 | Shen | G06F 17/2872 |
| | | | | 704/9 |
| 2011/0153641 | A1 | 6/2011 | Thorup et al. | |
| 2011/0173222 | A1 | 7/2011 | Sayal et al. | |
| 2011/0225181 | A1 | 9/2011 | Kubicki et al. | |
| 2012/0143897 | A1 | 6/2012 | Wei et al. | |
| 2012/0239682 | A1 | 9/2012 | Wedeniwski | |
| 2012/0310648 | A1 | 12/2012 | Shimizu | |
| 2013/0297604 | A1* | 11/2013 | Sutedja | G06Q 10/107 |
| | | | | 707/737 |
| 2014/0163952 | A1* | 6/2014 | Brawer | G06F 17/2223 |
| | | | | 704/5 |

FOREIGN PATENT DOCUMENTS

| | | |
|---|---|---|
| CN | 103020116 A | 4/2013 |
| CN | 103136337 A | 6/2013 |
| CN | 102902780 B | 4/2016 |

OTHER PUBLICATIONS

Tencent Technology, IPRP, PCT/CN2013/091197, dated Dec. 22, 2015, 4 pgs.

* cited by examiner

PROCESSING METHOD AND DEVICE OF THE USER INPUT INFORMATION

RELATED APPLICATIONS

This application is a continuation application of PCT Patent Application No. PCT/CN2013/091197, entitled "PROCESSING METHOD AND DEVICE OF THE USER INPUT INFORMATION" filed Dec. 31, 2013, which claims priority to Chinese Patent Application Serial No. CN201310246467.X, entitled "METHOD AND DEVICE OF PROCESSING USER INPUT INFORMATION", filed Jun. 20, 2013, both of which are incorporated herein by reference in their entirety.

FIELD OF THE INVENTION

The present invention relates to the communication technical field, in particular, to a method and device for processing user input information.

BACKGROUND OF THE INVENTION

With the rapid development of communication technology, the types and functions of terminal applications are becoming more and more diversified. The terminal application for determining user intent is one of such applications. In these terminal applications, for example, a speech processing application can receive the user input information (e.g., a textual string or a speech input), identify user intent according to the user input information, and then provide corresponding service to the user according to the determined user intent. In other words, through using these terminal applications, a user can interact with a computer using a natural language to a certain extent, realizing man-machine interaction.

In conventional technology, in general, user intent may be identified by matching the obtained user input information with one or more regular rules. The so called regular rule is also referred to as the regular expression rule, which is a filter rule (or matching rule) set based on a regular expression of accepted inputs. However, a regular expression refers to a single character string which is used to describe or match a character string meeting a certain syntactic rule. When matching the user input information, in general, parameters in the user input information can be extracted at fixed positions. Therefore, for scenarios where fixed input statements are used, in general, relevant parameters can be correctly extracted and user intention can be identified.

During the research and practice of conventional technology, it is discovered that even though the conventional scheme can identify user intent well for the scenarios in which fixed statements are used, however, for the scenarios in which diverse statements may be used, the real user intent cannot be easily identified.

SUMMARY

In this disclosure, a method and device for processing user input information with the goal of identifying the correct user intent for performing an appropriate action on a computing device are disclosed. In one aspect, multiple intermediate results containing different combinations of the named entities recognized from the user input are obtained in accordance with a regular expression pattern derived from a respective usage rule representing a task or user intent. The correct named entity parameters of the task or user intent are identified by comparing a standard regular expression and each intermediate result to identify a matched intermediate result, where the standard regular expression is also derived from the respective usage rule representing the task or user intent. The regular expression pattern and the standard regular expression are obtained from the usage rule using different transformations, such that the standard regular expression can capture the regular expression pattern when the regular expression pattern is filled with the correct named entities recognized from the user input information. By using different transformations to obtain the regular expression pattern and the standard regular expression for the same rule string of the usage rule, the matching between the user input and the rule string can be made more flexible, increasing the likelihood of a matching success.

In one aspect, a method of processing user input information includes: at a device having one or more processors and memory: storing a respective usage rule for processing a user request for a task, the respective usage rule comprising a respective rule string, a respective command index number, and a respective parameter string; performing a first transformation on the respective rule string of the respective usage rule to obtain a respective regular expression pattern; performing a second transformation on the respective rule string of the respective usage rule to obtain a respective standard regular expression; obtaining a user input that matches the respective rule string of the respective usage rule; obtaining a concatenated parameter string using the respective regular expression pattern and the respective standard regular expression; and executing a command corresponding to the respective command index number using the concatenated parameter string. In some embodiments, obtaining the concatenated parameter string using the respective regular expression pattern and the respective standard regular expression further comprises: in accordance with a determination that the user input matches the respective rule string of the respective usage rule, extracting a respective intermediate parameter from the user input in accordance with the respective regular expression pattern, the extracting leaving a reminder portion of the user input; performing named entity recognition for the respective intermediate parameter to obtain at least one named entity result; generating at least one intermediate result by concatenating the recognized named entity result with the remainder portion of the user input; performing matching analysis between the at least one intermediate result and the respective standard regular expression to determine a matched named entity result; and obtaining actual parameter values for the concatenated parameter string based on one or more respective named entities identified in accordance with the matched named entity result.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
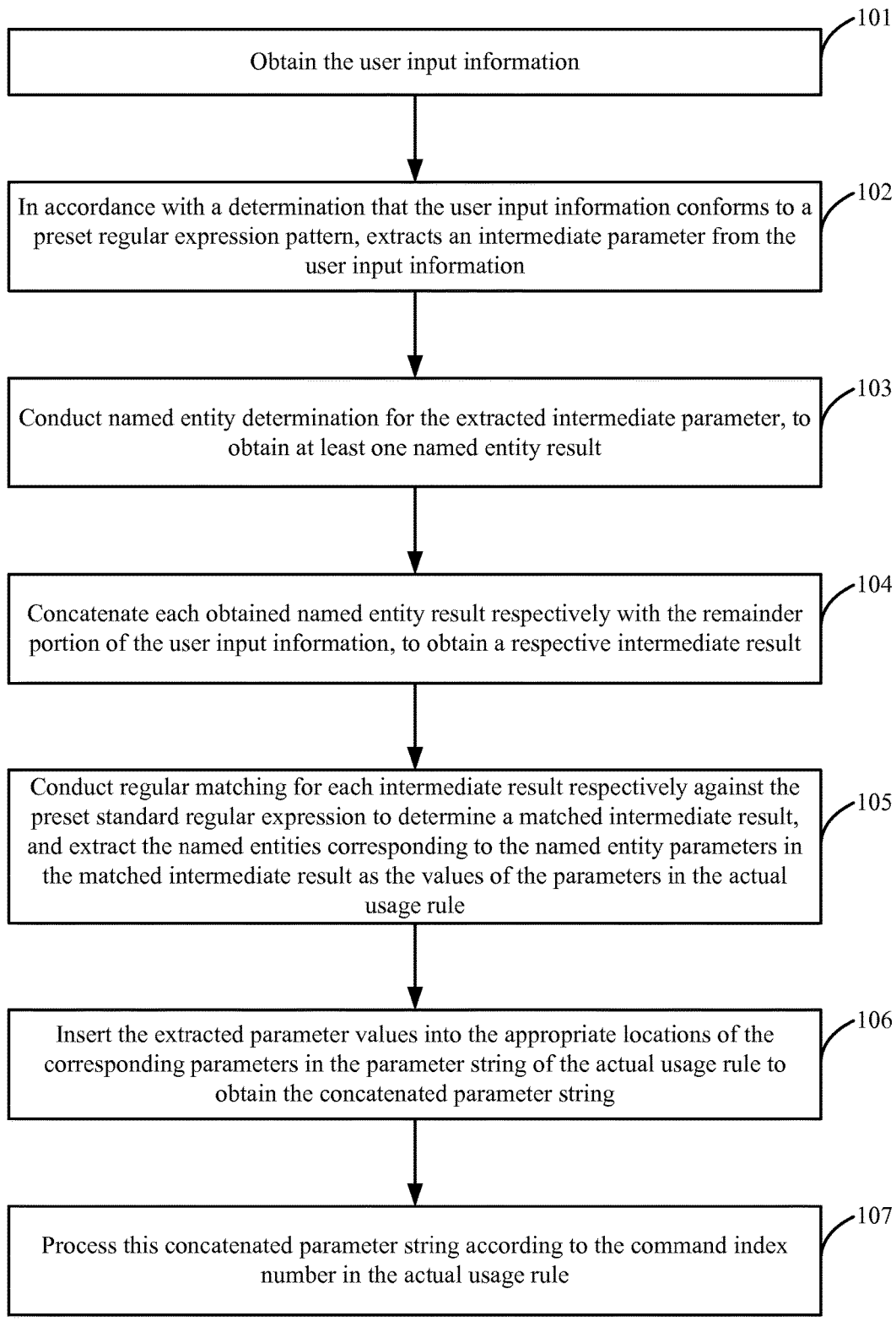
FIG. 1 is a flowchart diagram of a method of processing user input information in accordance with some embodiments.

A method and device for processing user input information in accordance with some embodiments is provided with respect to FIG. 1.

In some embodiments, the device performing the processing of the user input information is a user device such as a smart phone, a tablet device, an ebook reader, an MP3 player (Moving Picture Experts Group Audio Layer III), an MP4 (Moving Picture Experts Group Audio Layer IV) player, a laptop, a desk computer and so on. In some embodiments, the device performing the processing of the user input information can be a remote server. In some embodiments, some steps of the method can be performed on a set of interacting devices, such as a client device and a server device.

In some embodiments, the method of processing the user input information includes: obtaining the user input information; when it is determined that the user input information satisfies a respective preset regular expression pattern (e.g., a regular expression pattern derived from a rule string of a particular usage rule associated with a task or user intent using a first transformation), extracting an intermediate parameter from the user input information (e.g., extracting the intermediate parameter according to a first transformation of the rule string), performing named entity recognition on the extracted intermediate parameter, obtaining at least one named entity result from the intermediate parameter, concatenating each named entity result respectively with the remainder portion of the user input information to obtain a respective intermediate result, conducting regular expression matching for each intermediate result respectively against a preset standard regular expression (e.g., a standard regular expression derived from the rule string of the usage rule using a second transformation) to determine a matched intermediate result, obtaining the named entities corresponding to the parameters in the matched intermediate result as the actual values of the named entity parameters in the parameter string of the usage rule, inserting the actual values of the named entity parameters into the parameter string in the usage rule to obtain a concatenated parameter string, and processing this concatenated parameter string according to a command identified by the command index number in the usage rule.

As shown in FIG. 1, the detailed process can be as follows:

101, a device obtains the user input information.

For example, the user input information can be a textual string received from a user, or a result of speech-to-text processing of a speech input received from the user. For example, a user may provide a natural language speech input using a microphone installed on a user device, and the user input information is a textual string obtained through speech-to-text processing of the natural language speech input at the user device or at a remote server. In some embodiments, the user may enter a textual string (e.g., "Find the nearest McDonald's") in a graphical user interface provided on a user device. In some embodiments, the device performing the processing of the user input information is the user device that receives the user input directly from the user. In some embodiments, the device performing the processing of the user input information is a processing device other than the user device directly capturing the user's input. In some embodiments, the device performing the processing of the user input information is a remote server.

102, the device, in accordance with a determination that the user input information obtained by Step 101 conforms to a preset regular expression pattern (e.g., the regular expression pattern obtained by transforming the rule string of a particular usage rule), extracts an intermediate parameter from the user input information.

In some embodiments, this preset regular expression pattern is established according to an actual usage rule, where this actual usage rule includes a rule string (e.g., a string pattern representing an acceptable or recognizable user input for requesting a particular task or expressing a particular user intent, such as "Find a <business type> nearby," or "Look up the <transportation type> schedule for <Time>," etc.), a command index number, and a parameter string (e.g., a parameter string listing the parameters needed by a command referenced by the command index number).

For example, for the task or user intent for inquiring about the trains from one city to another city, the actual usage rule can be represented concretely as:

% p28(到|去) % p28(火车|列车|车次) 10020 1|% s1|% s2|3|% s

In the above usage rule, "% p28(到|去) % p28(火车|列车|车次)" is the rule string. The rule string is an abstraction of multiple possible expressions in Chinese for saying "trains from one place to another place." A literal English translation of the above Chinese rule string is % p28 ("arrive"|"go") % p28(expression 1 for the term "train"|expression 2 for the term "train"|expression 3 for the term "train"). The Chinese rule string reflects the correct grammar for placing the names of the start and the destination of the train in the remainder of the rule string to make up the correct expression in Chinese expression for "trains from one place to another place." The parameter "% p28" is a placeholder for inserting the names of the starting and destination places, respectively. An analogous rule string in English would be "(trains|train schedule|schedule for trains|) from % p28 to % p28", in accordance with some embodiments.

In the above usage rule, "10020" is the command index number for the command processing a task corresponding to looking up trains from one city to another city. For example, in some embodiments, each task that can be performed by the device has a respective command index number, and a respective command for starting a set of processing steps to perform the requested task. The processing steps take the parameters as specified by the parameter string of the usage rule.

In the above usage rule, "1|% s1|% s2|3|% s" is a parameter string for the processing steps identified by the command index number. The parameter values of the parameter string will be filled out with the actual parameter values subsequently obtained from the user input information. In this example, the parameters "1" or "3" in the above parameter string are fixed values. The parameters % s1, % s2, and % s will be replaced with corresponding actual parameter values derived from the user input information, before the parameter string is provided to the process represented by the command index number 10020. The parameter string containing the actual parameter values rather than the parameter identifiers (e.g., % s1, % s2, and % s) is referred to as a concatenated parameter string.

In some embodiments, before obtaining the user input information (i.e. Step 101), the method of processing the user input information includes:

Obtaining a predetermined actual usage rule, where this actual usage rule includes a respective rule string, a respective command index number, and a respective parameter string; and converting the rule string in this actual usage rule to a regular expression pattern, and convert the rule string in this actual usage rule to a standard regular expression. For example, in some embodiments, the device performs the following steps:

(1) To convert the rule string in this actual usage rule to a regular expression pattern:

The device converts the content between the first parameter and the last parameter in this rule string to a first identifier, where the first identifier is used to indicate a position for extracting a parameter. For example, this first identifier can be "% s1", specifically, in some embodiments.

In some embodiments, the identifier "% pxx" in a rule string is a named entity placeholder, which is also called a named entity position parameter or a parameter in the rule string. Taking the rule string "% p28(到去) % p28(火车|列车|车次)" as an example, the identifier "% p28" in the rule string of the actual usage rule is a parameter in the rule string. If the first identifier is "% s1", the device can convert the content between the first "% pxx" and the last "% pxx" in this rule string to "% s1", namely, the device can convert the content between the two "% p28" (including the two "% p28") to "% s1", as "% s1(火车|列车|车次)".

In the above example, the regular expression "% s1(火车|列车|车次)" is the regular expression pattern obtained from the rule string "% p28(到去) % p28(火车|列车|车次)" through the first transformation described above.

(2) To convert the rule string in this actual usage rule to a standard regular expression:

The device separately adds a second identifier immediately before and immediately after each parameter of the rule string. In some embodiments, this second identifier is used to identify a parameter that can be used to match any arbitrary character string. For example, this second identifier can be ".*", specifically, in some embodiments.

For example, still taking the rule string "% p28(到去) % p28(火车|列车|车次)" as an example. If the second identifier is ".*", the device adds ".*" in front of and after each % pxx in the rule string. In other words, the device adds ".*" before and after each "% p28" in the rule string to obtain a standard regular expression ".*% p28.*(到去).*% p28.*(火车|列车|车次)". This standard regular expression is a more general representation of the rule string.

It should be noted that, there may exist many pieces of regular expression patterns in a system. The regular expression patterns may be stored in respective vectors. In addition, the regular expression patterns with different priorities can be stored in different vectors. In some embodiments, the regular expression pattern with the higher priorities shall be processed earlier, and the regular expression patterns with the same priority level shall be processed in turn according to the preconfigured order by which they appear. In some embodiments, the Step 102 can performed as follows:

The device determines the current regular expression pattern from many pieces of regular expression patterns according to an order of descending order of priorities, determines whether the user input information meets the current regular expression pattern; if the user input information meets the current regular expression pattern, the device extracts an intermediate parameter from the user input information, and if the user input information does not meet the current regular expression pattern, the device moves on to process the next regular expression pattern.

In some embodiments, to extract the intermediate parameter from the user input information, the device extracts the portion of the user input information that corresponds to the first identifier in the regular expression pattern converted from the rule string. After the intermediate parameter is extracted from the user input information, the remainder portion of the user input information is stored for subsequent use.

103, the device conducts named entity determination for the extracted intermediate parameter, to obtain at least one named entity result. For example, in some embodiments, the device performs matching for the extracted intermediate parameter against preset named entities in a named entity library, and obtains at least one named entity result matching this extracted intermediate parameter. For example, the device may recognize the intermediate parameter as one or more alternative sets of one or more named entities, each set of one or more name entities serving as a respective named entity result.

In some embodiments, a named entity is the name of a person, the name of an institution, a place name, and other names that are used to identify entities. In some embodiments, entities in a broader sense can also include numbers, dates, currency, addresses, and so on.

In some embodiments, the named entity library can be pre-established by maintainers. In some embodiments, the named entity library can also be self-built after the system collects resources from the Internet, and before the system obtains the user input information (i.e. Step 101). In some embodiments, the method can also include: building a named entity library, where this named entity library can be stored using a Double-Array Trie.

104, the device concatenates each obtained named entity result respectively with the remainder portion of the user input information, to obtain a respective intermediate result, the mentioned remainder portion is the remainder of the user input information after the intermediate parameter has been extracted. Since the device has obtained at least one named entity result, the device will obtain an equal number of intermediate results.

105, the device conducts regular matching (e.g., matching or filtering using the standard regular expression) for each intermediate result respectively against the preset standard regular expression (i.e., the standard regular expression derived from the usage rule that produced the regular expression pattern matching the user input information) to determine a matched intermediate result, and extracts the named entities corresponding to the named entity parameters in the matched intermediate result as the values of the parameters in the actual usage rule.

In some embodiments, the standard regular expression is derived by converting the rule string in the actual usage rule, e.g., as described in Step 102.

106, the device inserts the extracted parameter values into the appropriate locations of the corresponding parameters in the parameter string of the actual usage rule to obtain the concatenated parameter string.

107, the device processes this concatenated parameter string according to the command index number in the actual usage rule. For example, in some embodiments, the processing includes:

Calling the corresponding command word according to the command index number in the actual usage rule, and using this command word to process the concatenated parameter string.

From the above, the method includes: obtaining user input information; determining whether the user input information meets a preset regular expression pattern; if it is determined that the user input information meets the preset regular expression pattern; extracting an intermediate parameter from the user input information; conducting named entity determination for the intermediate parameter; obtaining at least one named entity result from the intermediate parameter; concatenating each named entity result respectively with the remainder of the user input information to obtain a respective intermediate result; conducting regular matching for each intermediate result respectively with a preset standard regular expression of the usage rule that produced the regular expression pattern to confirm a matched intermediate result; obtaining the named entities corresponding to the named entity parameters in the matched intermediate result as the actual parameter values for the parameter string of the actual usage rule; concatenate the actual parameter values with the parameter string of the actual usage rule to obtain the concatenated parameter string; and processing this concatenated parameter string according to the command index number in the actual usage rule to realize the purpose of identifying the user intent expressed in the user input information.

Because when matching the obtained user input information, the method described herein can determine the named entities from the extracted intermediate parameter, and use regular expressions to perform multiple rounds of extraction, matching, and concatenation on the user input information, the method can match the obtained user input information more flexibly and comprehensively, so as to fully obtain various possibilities meeting user intention. In other words, even for the scenarios with many flexible statements expressing the user intentions, this scheme can identify the user intention effectively, and accurately extract the relevant parameters for post-processing use.

According to the method described herein, the following will describe the process in detail by taking a concrete example, e.g., the scenario of inquiring about train schedules.

In this scenario, the user may say "查一下深圳到北京的火车" (the corresponding English translation is "Look up trains of Shenzhen to Beijing"), "深圳到北京有哪些车次" (the corresponding English translation is "What train times are there from Shenzhen to Beijing"), "深圳到北京 有没有卧铺" (the corresponding English translation is "Are there sleeping cars for Shenzhen to Beijing"), "查一下广州来这里的火车" (the corresponding English translation is "Look up trains from Guangzhou to here"), and so on. The core sentence pattern of these different input is "<火车站城市> 到<火车站城市>(火车|车次|卧铺)" (the corresponding English translation is "<city of train station> to <city of train station> (trains|train times|sleeping cars)") or "<火车站城市>来这里的火车" (the corresponding English translation is "<city of train station> trains that come here"), among which, "火车站城市" (the corresponding English translation is "city of train station") is a named entity. Note that the corresponding English translations provided above do not reflect the correct Chinese grammar for the core sentence patterns. The sentence patterns for each type of task or user intent may be obtained by finding the common and inter-changeable parts of the user inputs, and substitute the equivalent parts such as entity names and alternative words with the same meaning with placeholders. For example, in some embodiments, "% pxx" is used as the named entity placeholder in the sentence pattern. In other words, "% pxx" is used as the parameter in this rule string ""% pxx" 到 "% pxx" (火车|车次|卧铺)." In some embodiments, the named entity placeholder "% pxx" corresponding to "<火车站城市>" is "% p28". As a person of ordinary skills in the art can appreciate, different placeholders of the form "% pxx" can be used to represent different types of named entities. For example, "% p20" can represent school names, and "% p16" can represent capital names, etc.

Figure 2:
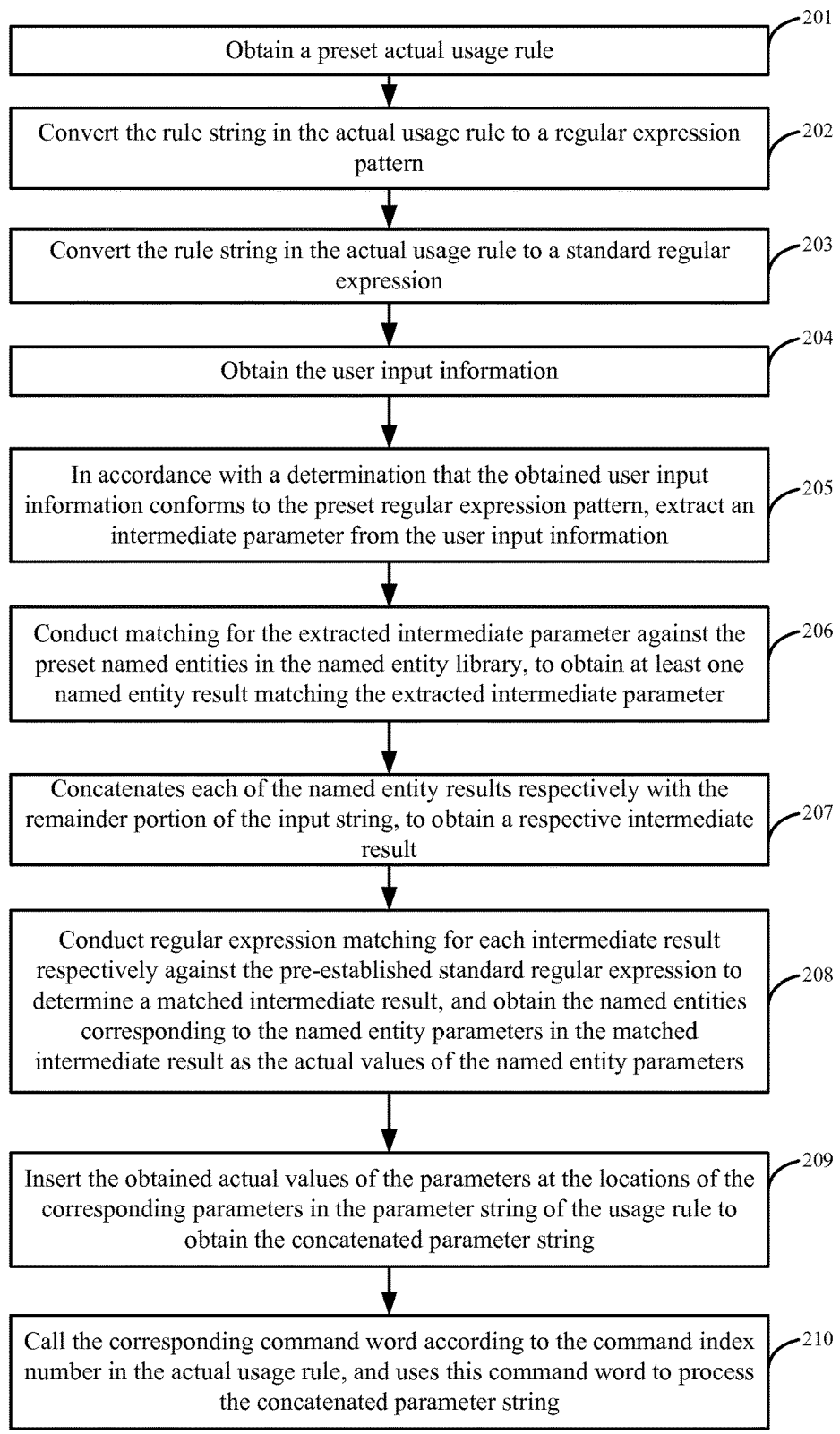
FIG. 2 is a flowchart diagram of a method of processing user input information in accordance with some embodiments.

The following will take the processing of user input information "查一下深圳到北京的火车." as an example to explain the method in more detail. As shown in FIG. 2, a method of processing the user input information can be as follows:

201, the device obtains a preset actual usage rule.

In some embodiments, this actual usage rule can include a respective rule string, a respective command index number, and a respective parameter string or parameter string. In some embodiments, the actual usage rule is also referred to as a usage rule, because the usage rule is distilled from the patterns found in many actual user inputs. The usage rule includes a rule string, which can be a string including one or more parameters (e.g., "% p28" representing <火车站城市>) or words (e.g., "火车") in a sequence. In some embodiments, the rule string also includes interchangeable words (e.g., "(火车|车次|卧铺)"). For example, this actual usage rule can concretely be as follows:

% p28(到|去) % p28(火车|车次|卧铺) 10020 1|% s1|% s2|3|% s

Among which, "% p28(到|去) % p28(火车|车次|卧铺)" is the rule string part, "10020" is command index number, and "1|% s1|% s2|3|% s" is a parameter string.

As shown above, the parameter string includes parameters (e.g., "% s1", "% s2", and "% s") that can be replaced with actual parameter values, and characters or words (e.g., "1" and "3") that will not be changed when provided to a processing procedure identified by the command index number.

In some embodiments, the rule string is mainly used to subsequently convert to a regular expression pattern and a standard regular expression to match the original input string (i.e. the original user input information). The command index number is the command index number used to identify the command for processing the parameter string after this rule is matched; and the parameter string is mainly used for the subsequent parameter string concatenation using the actual parameter values (e.g., actual names of the named entities) obtained from the user input information.

In some embodiments, when concatenating the parts of the parameter string subsequently, the "% sn" in the parameter string will be replaced with the entity name corresponding to the "nth" named entity identified in the user input string. For example, "% s1" will be replaced with the name corresponding to the first named entity identified in the user input string, "% s2" will be replaced with the name corresponding to the second named entity identified in the user input string, "% s3" will be replaced the name corresponding to the third named entity identified in the user input string, and "% s" will be replaced with the whole original user input string (i.e. the original user input information). For example, if the original input string is "查一下深圳到北京的火车", among which, the name corresponding to the first named entity identified in the string is "深圳", the name corresponding to the second named entity identified in the string is "北京", and the concatenated parameter string is "1深圳北京3|查一下深圳到北京的火车".

202, the device converts the rule string in the actual usage rule to a regular expression pattern. For example, it can concretely be as follows:

The device converts the content between the first parameter and the last parameter in the rule string to a first identifier, where this first identifier is used to indicate an intermediate parameter extracted at the location of the first identifier. For example, this first identifier can concretely be "% s1".

Taking the rule string "% p28(到|去) % p28(火车|车次|卧铺)" as an example, if the first identifier is "% s1", the content between the first "% pxx" and last "% pxx" in this rule string is converted to "% s1", namely, the content between the two "% p28" is converted to "% s1", to obtain a regular expression pattern "% s1(火车|车次|卧铺)".

203, the device also converts the rule string in the actual usage rule to a standard regular expression. For example, it can concretely be as follows:

The device separately adds a second identifier in front of and after each parameter in the rule string, where this second identifier is used to identify locations for parameters which can be matched to any arbitrary character string. For example, this second identifier can concretely be a wildcard ".*".

For example, still taking the rule string "% p28(到|去) % p28(火车|车次|卧铺)" as an example, if the second identifier is ".*", ".*" is added before and after each parameter % pxx in the rule string, namely, ".*" is added before and after each "% p28" in the rule string, to obtain a standard regular expression ".*% p28.*(到|去).*% p28.*(火车|车次|卧铺)".

204, the device obtains the user input information.

For example, if user inputs "查一下深圳到北京的火车" on the device, at this moment, the obtained user input information by the device is: "查一下深圳到北京的火车", this user input information is also called as original character string, or the original string for short.

205, when the device determines that the obtained user input information conforms to the preset regular expression pattern (e.g., "% p28(到|去) % p28(火车|列车|车次) 10020 1|% s1|% s2|3|% s"), the device extracts an intermediate parameter from the user input information (e.g., "查一下深圳到北京的火车").

For example, if the user input information obtained in Step 204 is "查一下深圳到北京的火车", and at this moment, because "查一下深圳到北京的火车" conforms to the regular expression pattern "% s (火车|车次|卧铺)" of the actual usage rule, the device can extract the intermediate parameter (e.g., "查一下深圳到北京的") from this user input information: "查一下深圳到北京的火车".

206, the device will conduct matching for the extracted intermediate parameter against the preset named entities in the named entity library, to obtain at least one named entity result matching the extracted intermediate parameter.

For example, in some embodiments, there are many kinds of named entities stored in the system, so the device needs conduct named entity extraction and verification from the intermediate parameter for each kind of named entities, so as to obtain all possible combinations of the extracted named entities as the named entity results. For example, the word "北京" (the corresponding English translation is "Beijing") is not only a named entity "% p28" for "city of train station", but also a named entity "% p16" of "capital". At the same time, suppose "深圳到北京" is the name of a song, and belongs to a type of named entity "% p48" for "song." When conducting named entity determination for the intermediate parameter "查一下深圳到北京的", the device will return three different named entity results:

(1) 查一下 % p28 到 % p28 的;
(2) 查一下 % p28 到 % p16 的;
(3) 查一下 % p48 的.

In the above named entity results, the actual names of the named entities identified in the intermediate parameter have been replaced by the corresponding identifier (e.g., % p28, % p16, or % p48) for the named entity type of the actual names, respectively.

In some embodiments, the named entity library can be pre-established by maintainers. In some embodiments, the named entity library can also be self-built after the system collects resources on the Internet. In some embodiments, the named entity library can be stored in a Double-Array Trie. The following will briefly explain the named entity matching method based on a Double-Array Trie.

First, the device collects and organizes the list of named entities that may be required in usage. Taking the scenario of inquiring about train schedules as an example, a "city of train station" named entity library, a "Capital name" named entity library and "Song name" named entity library are collected.

Second, the device stores these named entity libraries in the form of a Double-Array Trie. For example, the device optionally establishes a field-specific entity name library for each type of entity names, by using the named entities for the specific filed as vocabulary, and storing the index for the storage location of relevant information (here, the relevant information of the named entities can be stored using any custom structure) of each named entity as the value at leaf nodes of the Trie. In some embodiments, each kind of named entities can correspond to a respective Trie.

In addition, for each sentence to be processed for named entity matching by the device (e.g., the intermediate parameter to be processed for named entity matching by the device), the device uses each of the different field-specific Double-Array Trie for the different types of named entities to conduct the match one by one. Still take the intermediate parameter "查一下深圳到北京的" as an example, first, the "city of train station" Trie is used for the matching process, which returns two named entities "深圳" and "北京" (i.e., two cities with train stations). Then, the "capital name" Trie is used for the matching process, which returns a named entity of "北京" (i.e., the capital of China). Then, the "Song name" Trie is used for the matching process, which returns a named entity of "深圳到北京". When all the field-specific Tries are used in the matching process, the device sort out all the obtained named entities and their corresponding types:

"深圳" and "北京"→name of city of train station;
"北京"->Capital name; and
"深圳到北京"->Song name.

The device obtains possible combinations for all these different types of named entities in accordance with the entity names recognized in the original input string. Continue with the above example, the device will obtain the following combinations:

(1) 查一下 <city of train station: 深圳 >到<city of train station: 北京 >的;
(2) 查一下 <city of train station: 深圳 >到<capital name: 北京 >的;
(3) 查一下<song name: 深圳到北京 >的.

Therefore, after the named entity matching is finished, the device can obtain three named entity results:

(1) 查一下% p28 到 % p28 的;
(2) 查一下% p28 到 % p16 的;
(3) 查一下% p48 的.

207, the device concatenates each of the named entity results respectively with the remainder portion of the input string, to obtain a respective intermediate result, where the remainder portion is the remaining portion of the user input information after the intermediate parameter has been extracted.

For example, still take "查一下深圳到北京的火车" as an example, if in Step 206, the returned named entity results are:

(1) 查一下 % p28 到 % p28 的;
(2) 查一下 % p28 到 % p16 的;
(3) 查一下 % p48 的.

Thus, the intermediate results obtained by the concatenating are:

(1) 查一下 % p28 到 % p28 的火车;
(2) 查一下 % p28 到 % p16 的火车;
(3) 查一下 % p48 的火车.

208, the device conducts regular expression matching for each intermediate result respectively against the pre-established standard regular expression to determine a matched intermediate result, and obtains the named entities corresponding to the named entity parameters in the matched intermediate result as the actual values of the named entity parameters.

For example, the device optionally uses a "regexec" function to conduct the regular expression matching for the three intermediate results obtained by Step 207 respectively against the pre-established standard regular expression, to find out that the first intermediate result "查一下 % p28 到 % p28 的火车" matches standard regular expression ".*% p28.*(到|去).*% p28.*(火车|列车|车次)". Therefore, the device determines that intermediate result "查一下 % p28 到 % p28 的火车." is the matched intermediate result, and obtains the named entities corresponding to the named entity parameters % p28 in the matched intermediate result (namely, "深圳" and "北京") as the actual values of the parameters in the parameter string.

209, the device inserts the obtained actual values of the parameters at the locations of the corresponding parameters in the parameter string of the usage rule to obtain the concatenated parameter string.

For example, if in Step 208, the obtained actual parameters are "深圳" and "北京" respectively, the device concatenates these actual parameters and the parameter string "1|% s1|% s2|3|% s" to obtained the concatenated parameter string: "1 |深圳|北京| 3 |查一下深圳 到北京的火车", where % s1 is replaced with the first parameter value (i.e., the first named entity "深圳" obtained from the matched intermediate result), % s2 is replaced with the second parameter value (i.e., the second named entity "北京" obtained from the matched intermediate result), and % s is replaced with the original input string "查一下深圳 到北京的 火车".

210, the device calls the corresponding command word according to the command index number in the actual usage rule, and uses this command word to process the concatenated parameter string.

For example, take the following actual usage rule as an example:

% p28(到|去) % p28(火车|车次|卧铺) 10020 1|% s1|% s2|3|% s

At this moment, the device calls the command word corresponding to the command index number "10020", uses this command word to process the concatenated parameter string, namely, "1 |深圳|北京| 3 |查一下深圳 到北京的火车".

In some embodiments, the method described above is performed on a single device or a server and a client device. In some embodiments, the steps for generating the respective regular expression pattern and the respective standard regular expression for each actual usage rule are optionally performed by a server, before the user input information is received. In some embodiments, the named entity libraries are optionally generated and stored by a server as well. In some embodiments, the steps of receiving the user input information, determining whether the user input information matches the respective regular expression pattern of a particular actual usage rule, extracting the intermediate parameter according to the respective regular expression pattern of the actual usage rule, performing the named entity extraction on the intermediate parameter, obtaining the intermediate results, and matching each of the intermediate results to the respective standard regular expression of the actual usage rule to find a matched intermediate result, obtaining the named entities of the parameters in the matched intermediate result, generating the concatenated parameter string using the parameter string in the actual usage rule and the obtained named entities; and calling the command according to the command index number to process the concatenated parameter string, are optionally allocated between a server and a client device according to different design configurations that are suitable in light of the respective processing capabilities of the server and the client device.

Figure 3:
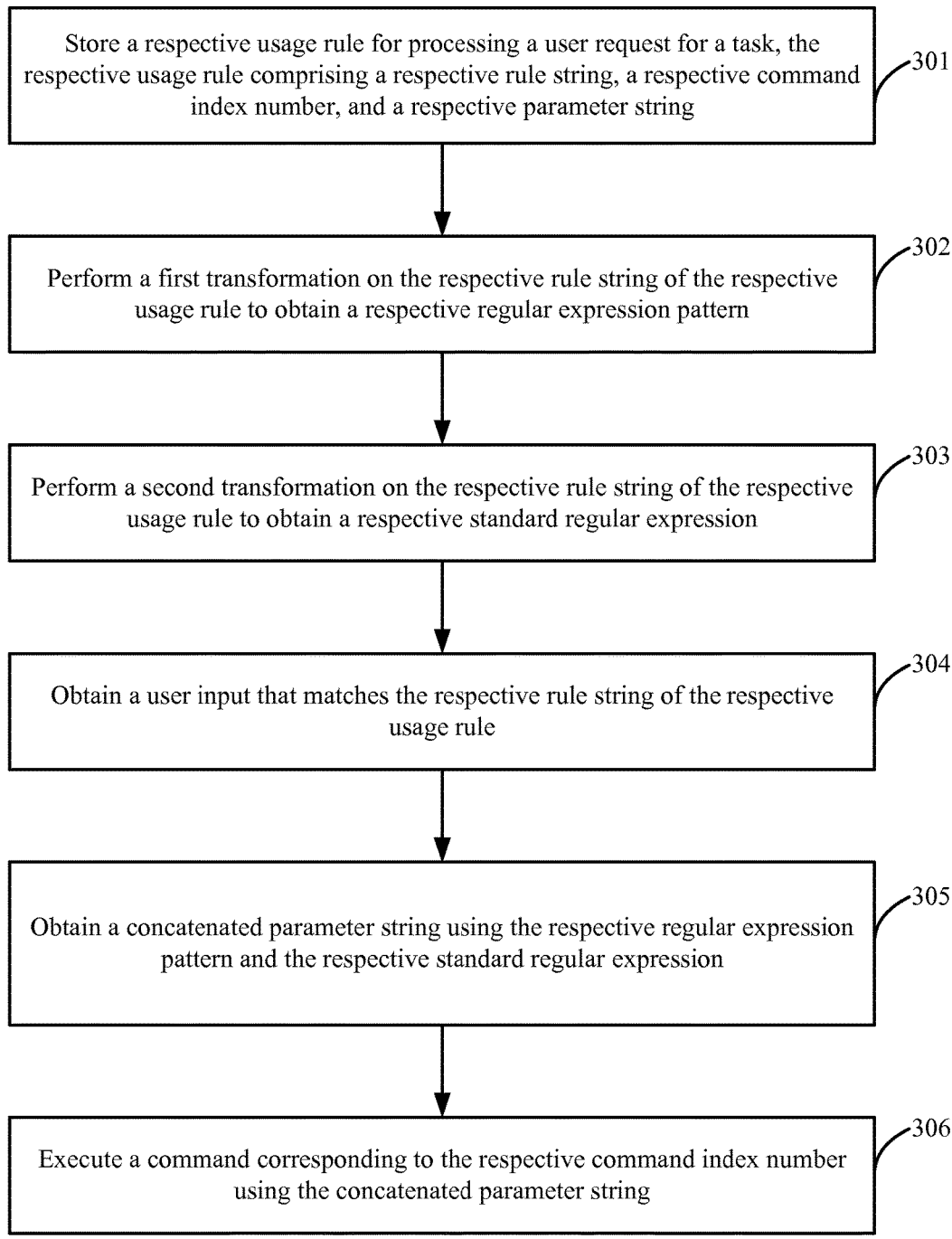
FIG. 3 is a flowchart diagram of a method of processing user input information in accordance with some embodiments.

FIG. 3 is a flowchart diagram of another method for processing user input information based on the methods described above. As shown in FIG. 3, the method includes:

301, the device stores a respective usage rule for processing a user request for a task, the respective usage rule comprising a respective rule string, a respective command index number, and a respective parameter string;

302, the device performs a first transformation on the respective rule string of the respective usage rule to obtain a respective regular expression pattern;

303, the device performs a second transformation on the respective rule string of the respective usage rule to obtain a respective standard regular expression;

304, the device obtains a user input that matches the respective rule string of the respective usage rule; and

305, the device obtains a concatenated parameter string using the respective regular expression pattern and the respective standard regular expression.

In some embodiments, the method further includes: 306, the device executes a command corresponding to the respective command index number using the concatenated parameter string.

In some embodiments, obtaining the concatenated parameter string using the respective regular expression pattern and the respective standard regular expression further includes: in accordance with a determination that the user input matches the respective rule string of the respective usage rule, extracting a respective intermediate parameter from the user input in accordance with the respective regular expression pattern, the extracting leaving a reminder portion of the user input; performing named entity recognition for the respective intermediate parameter to obtain at least one named entity result; generating at least one intermediate result by concatenating the recognized named entity result with the remainder portion of the user input; performing matching analysis between the at least one intermediate result and the respective standard regular expression to determine a matched named entity result; and obtaining actual parameter values for the concatenated parameter string based on one or more respective named entities identified in accordance with the matched named entity result.

In some embodiments, obtaining the concatenated parameter string using the respective regular expression pattern and the respective standard regular expression further includes: constructing the concatenated parameter string in accordance with the respective parameter string of the respective usage rule and the one or more respective named entities identified in accordance with the matched named entity result.

In some embodiments, performing the first transformation on the respective rule string of the respective usage rule to obtain the respective regular expression pattern further includes: identifying content between a first parameter and a second parameter in the respective rule string of the respective usage rule; and generating the respective regular expression pattern for the respective usage rule by substituting the content between the first parameter and the second parameter with a first identifier.

In some embodiments, extracting the respective intermediate parameter from the user input in accordance with the respective regular expression pattern further includes: extracting the respective intermediate parameter from the user input at a location indicated by the first identifier.

In some embodiments, performing the second transformation on the respective rule string of the respective usage rule to obtain the respective standard regular expression further includes: identifying all parameters in the respective rule string of the respective usage rule; and generating the respective standard regular expression for the respective usage rule by inserting a second identifier before and after each parameter identified in the respective rule string of the respective usage rule.

In some embodiments, performing the matching analysis between the at least one intermediate result and the respective standard regular expression further includes: determining whether each of the at least one intermediate result matches the respective standard regular expression; and in accordance with a determination that a respective one of the at least one intermediate result matches the respective standard regular expression, using the respective intermediate result as the matched intermediate result.

In some embodiments, the method further includes: storing a plurality of usage rules each having a respective priority level; and processing the user input against respective regular expression patterns of the plurality of usage rules in an order according to descending priority levels of the plurality of usage rules to determine whether the user input matches the respective regular expression pattern of the respective usage rule.

It should be noted that, the aforementioned description is just the processing process of a single rule. It should be understood that, in a system, there can exist many pieces of regular expression patterns, many vectors can be used to store these regular expression patterns. The regular expression patterns with different priorities shall be stored in different vectors. The regular expression pattern with high priority shall be processed first, the regular expression patterns with the same priority shall be processed in turn according to the order they are configured to appear. The processing process of each usage rule is similar with the aforementioned process.

As described above, in some embodiments, the device obtains the user input information, determines when the user input information meets a preset regular expression pattern, extracts an intermediate parameter from the user input information, conducts named entity recognition in the intermediate parameter, obtains at least one named entity result, concatenate this named entity result respectively with the remainder of the input string, obtains at least one intermediate result, conducts regular expression matching for each intermediate result respectively with the preset standard regular expression to determine the matched intermediate result and obtains the actual parameter values corresponding to named entity parameters in the matched intermediate result, concatenates these actual parameter values with the parameter string in the usage rule to obtain the concatenated parameter string, and at last, processes this concatenated parameter string according to the command index number in the usage rule to realize the purpose of identifying user intention. Because when matching the obtained user input information, this scheme can determine the named entities for the extracted intermediate parameter, and uses the regular expressions to extract, match and concatenate the user input information for many times, it can match the obtained user input information more flexibly and comprehensively, so as to fully obtain various possibilities meeting the user intention. Even for the scenarios with flexible statements, this scheme can also identify user intention effectively, and accurately extract relevant parameters for post-processing use.

Figure 4A:
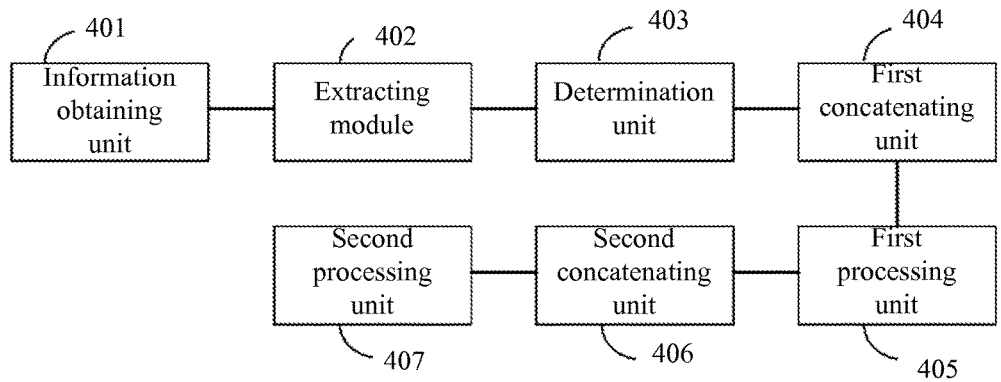
FIG. 4A is a structural schematic diagram of a device for processing user input information in accordance with some embodiments.

In order to implement the methods above better, the embodiment of the present invention provides a device for processing user input information. As shown in FIG. 4A, this processing device includes information obtaining unit 401, extraction unit 402, determination unit 403, first concatenating unit 404, first processing unit 405, second concatenating unit 406 and second processing unit 407.

Information obtaining unit 401, configured to obtain the user input information; for example, this user input information can be the input speech information or text information received from a user.

Extraction unit 402, configured to determine when this user input information conforms to a preset regular expression pattern, and extract an intermediate parameter from the user input information;

Among which, this regular expression pattern is established according to a usage rule, this usage rule can include a respective rule string, a respective command number and a respective parameter string. For example, for the task or user intent for inquiring about the trains from one city to another city, the actual usage rule can be represented concretely as:

% p28(到|去) % p28(火车|列车|车次) 10020 1|% s1|% s2|3|% s

In the above usage rule, "% p28(到|去) % p28(火车|列车|车次)" is the rule string, "10020" is the command index number, and "1|% s1|% s2|3|% s" is a parameter string.

Determination unit 403, configured to conduct named entity determination for the extracted intermediate parameter, to obtain at least one named entity result;

First concatenating unit 404, configured to concatenate each obtained named entity result respectively with the remainder portion of the user input information, to obtain a respective intermediate result, the mentioned remainder portion is the remainder of the user input information after the intermediate parameter has been extracted;

First processing unit 405, configured to conduct regular matching for each intermediate result respectively against the preset standard regular expression to determine a matched intermediate result, and extract the named entities corresponding to the named entity parameters in the matched intermediate result as the values of the parameters in the actual usage rule;

In some embodiments, the standard regular expression is derived by converting the rule string in the actual usage rule.

Second concatenating unit 406, configured to insert the extracted parameter values into the appropriate locations of the corresponding parameters in the parameter string of the actual usage rule to obtain the concatenated parameter string;

Second processing unit 407, configured to process this concatenated parameter string according to the command index number in the actual usage rule.

Figure 4B:
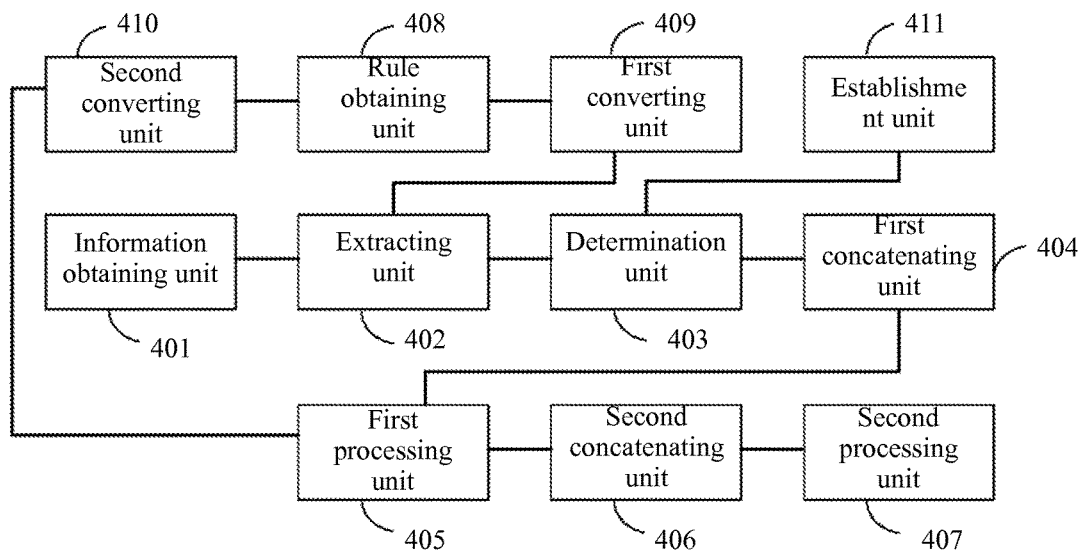
FIG. 4B is a structural schematic diagram of a device for processing user input information in accordance with some embodiments.

Optionally, prior to obtaining the user input information, the preset actual usage rule can also be obtained, allowing the device to convert the rule string in this actual usage rule to a regular expression pattern, and to convert the rule string in the actual usage rule to a standard regular expression. That is, as shown in FIG. 4B, the processing device can also includes rule obtaining unit 408, first converting unit 409 and second converting unit 410;

Rule obtaining unit 408, configured to obtain a preset actual usage rule.

In some embodiments, this actual usage rule can include a respective rule string, a respective command index number, and a respective parameter string or parameter string.

First converting unit 409, configured to convert the rule string in the actual usage rule to a regular expression pattern;

Second converting unit 410, configured to convert the rule string in the actual usage rule to a standard regular expression.

For example, first converting unit 409, configured specifically to convert the content between the first parameter and the last parameter in the rule string to a first identifier, where this first identifier is used to indicate an intermediate parameter extracted at the location of the first identifier. For example, this first identifier can concretely be "% s1".

Second converting unit 410, configured to separately add a second identifier in front of and after each parameter in the rule string, where this second identifier is used to identify locations for parameters which can be matched to any arbitrary character string. For example, this second identifier can concretely be a wildcard ".*".

In some embodiments, determination unit 403, configured specifically to conduct matching for the extracted intermediate parameter against the preset named entities in the named entity library, to obtain at least one named entity result matching the extracted intermediate parameter.

In some embodiments, a named entity is the name of a person, the name of an institution, a place name, and other names that are used to identify entities. In some embodiments, entities in a broader sense can also include numbers, dates, currency, addresses, and so on.

In some embodiments, the named entity library can be pre-established by maintainers. In some embodiments, the named entity library can also be self-built after the system collects resources from the Internet. That is, as shown in FIG. 4B, the device of processing input information can also includes establishment unit 411;

Establishment unit 411, configured to build a named entity library, where this named entity library can be stored using a Double-Array Trie.

In some embodiments, second processing unit 407, configured specifically to call the corresponding command word according to the command index number in the actual usage rule, and use this command word to process the concatenated parameter string.

It should be understood that, in a system, there can exist many pieces of regular expression patterns, many vectors can be used to store these regular expression patterns. The regular expression patterns with different priorities shall be stored in different vectors. The regular expression pattern with high priority shall be processed first, the regular expression patterns with the same priority shall be processed in turn according to the order they are configured to appear:

Extraction unit 402 is configured to determine the current regular expression pattern from many pieces of regular expression patterns according to an order of descending order of priorities, determine whether the user input information meets the current regular expression pattern; if the user input information meets the current regular expression pattern, extract an intermediate parameter from the user input information, and if the user input information does not meet the current regular expression pattern, move on to process the next regular expression pattern.

In specific implementation, each of units above can be implemented as independent entity, or as the same one or several entities through arbitrary combination.

The processing device can be integrated concretely in devices such as smart phones, tablets, e-readers, MP3 players, MP4 players, laptop portable computers, desktop computers, and so on.

From the above, information obtaining unit 401 of the processing device is used to obtain the user input information, after determining that the user input information meets a preset regular expression pattern, extracting unit 402 is used to extract an intermediate parameter from the input information of this user, and determination unit 303 is used for named entity determination to obtain at least one named entity result, after which, first concatenating unit 304 concatenates each named entity result respectively with the remainder of the input information to obtain a respective intermediate result, followed by regular expression matching for each intermediate result respectively with a preset standard regular expression by first processing unit 305 to confirm the matched intermediate result. Based on the matched intermediate result, second concatenating unit 306 extracts the actual parameter values corresponding to the named entity parameters in the matched intermediate result and concatenates the actual parameters with the parameter string of the actual usage rule to obtain a concatenated parameter string. At last, second processing unit 307 is used to process this concatenated parameter string according to the command index number in the actual usage rule to realize the purpose of identifying user intention. Because when matching the obtained user input information, this scheme can determine the named entities for the extracted intermediate parameter, and use the regular expression pattern to extract, match, and concatenate the user input information for multiple times, it can match the obtained user input information more flexibly and comprehensively, so as to fully obtain various possibilities meeting the user intention. In other words, even for the scenarios with flexible statements, this scheme can also identify user intention effectively, and accurately extract relevant parameters for post-processing use.

Figure 5:
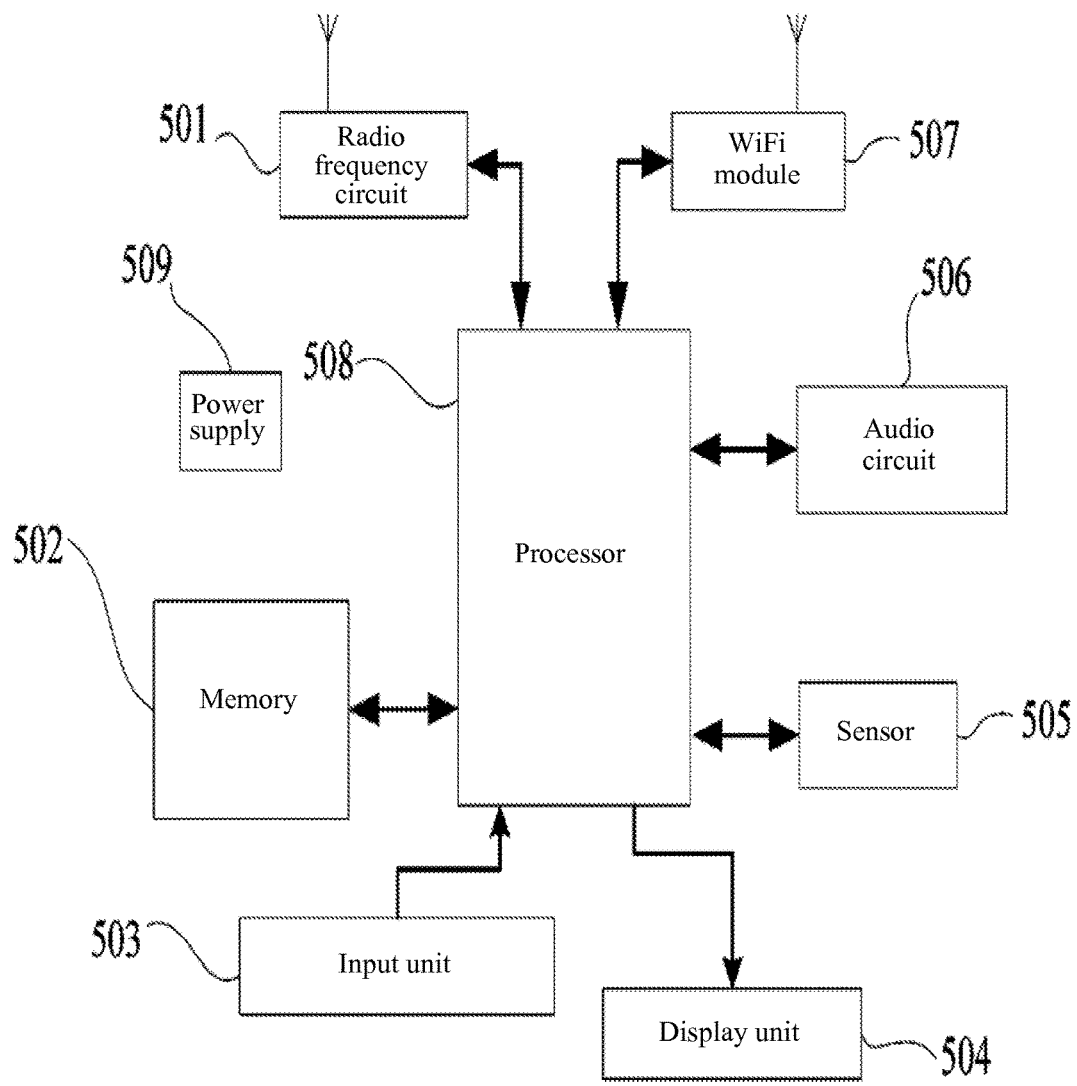
FIG. 5 is a structural schematic diagram of a device in accordance with some embodiments.

FIG. 5 is a structural diagram of an exemplary device 500 for processing user input information in accordance with some embodiments. The device 500 can perform some or all of the steps described above in accordance with various embodiments. The device 500 includes radio frequency (RF, Radio Frequency) circuit 501, memory 502 comprising of one or more computer-readable storage media, input unit 503, display unit 504, sensor 505, audio circuit 506, wireless fidelity (WiFi, Wireless Fidelity) module 507, processor 508 including one or more than one processing cores, power supply 509 and other parts. In actual embodiments, a device of processing user input information may include fewer or more components than those shown in FIG. 5. Some components shown in FIG. 5 may be combined or divided into sub-components.

RF circuit 501 is configured to send and receive information, or to send and receive signal during calling, in particular, to receive downlink information of base station, followed by handing it over to one or more processors 508 for processing; in addition, sending involved uplink data to base station. Generally, RF circuit 501 including but not limited to antenna, at least one amplifier, tuner, one or more oscillators, subscriber identity module (SIM, Subscriber Identity Module) card, transceiver, coupler, low-noise amplifier (LNA, Low Noise Amplifier) and duplexer, etc. In addition, RF circuit 501 can communicate through wireless communication, network and other devices. The mentioned wireless communication may use any communication standard or protocol, including but not limited to Global System of Mobile communication (GSM, Global System of Mobile communication), General Packet Radio Service (GPRS, General Packet Radio Service), Code Division Multiple Access (CDMA, Code Division Multiple Access), Wideband Code Division Multiple Access (WCDMA, Wideband Code Division Multiple Access), Long Term Evolution (LTE, Long Term Evolution), E-mail, Short Messaging Service (SMS, Short Messaging Service), etc.

Memory 502 is also configured to store software program and module, and processor 508 then performs various function applications and data processing by running software program and module stored in memory 502. Memory 502 may mainly include stored program area and stored data area, among which, stored program area stores operation system, application program required for at least one function (such as functions described with respect to FIGS. 1-4B), etc.; stored data area stores data created according to the use of the device (such as audio data, phone book, etc.) and so on. In addition, memory 502 may include high-speed random access memory, also include non-volatile memory, such as at least one disk storage device, flash memory devices, or other volatile solid state memory elements. Accordingly, memory 502 may also include memory controller, configured to provide processor 508 and input unit 503 with the access to memory 502.

Input unit 503, configured to receive the inputting of numeric or character information, and generate the signal input of keyboard, mouse, joystick, optical or trackball related to user settings and function control. Specifically, in one specific embodiment, input unit 503 includes touch-sensitive surface and other input devices. Input unit 503 also includes other input devices besides touch-sensitive surface.

Display unit 504 is configured to display the user input information or information provided for user and various graphical user interfaces of terminal, and these graphical user interface consisting of graph, text, icon, video and random combination of them.

The device also optionally includes one or more sensors 505, such as light sensor, motion sensor and other sensors.

Audio circuit 506, speaker and microphone provide audio interface between user and terminal. Audio circuit 506 can transmit the received electric signal from conversion of audio data to speaker, where electric signal is converted and output as acoustical signal; on the other hand, microphone converts the collected acoustical signal into electric signal, which is received and converted as audio data by audio circuit 506, after which, audio data is output from processor 508 for processing, followed by being sent to another terminal through RF circuit 501, or audio data can be output to memory 502 for further processing. Audio circuit 506 may also include earplug jack to provide communication between peripheral headset and the device.

WiFi module 507, which provides users with wireless access to broadband Internet.

Processor 508, acting as the control center of terminal, using various interfaces and circuits for connection of each part of the entire mobile phone, by operating or performing software program and/or module stored in memory 502, and calling the data stored in memory 502, performs various functions of terminal and processes data to realize the overall operation of the device 500. Optionally, processor 508 can include one or more processing cores, preferably, the aforementioned application processor and modem processor can be integrated in processor 508, among which, application processor mainly deals with the application processor operating system, user interface and application program and so on, while modem processor mainly deals with the wireless communication.

Device 500 also includes power supply 509 used for the power supply of various parts (such as battery), preferably, power supply can be connected logically with processor 508 by power supply management system, through which, charging, discharging, power management and other functions can be realized. Power supply 509 can also includes one or more DC or AC power supplies, recharging system, power failure detection circuit, power converter or inverter, power supply status indicators, and any components.

In some embodiments, specifically, processor 508 in device 500, according to the following commands, loads the executable files corresponding to the processes of one or more application programs to memory 502, and processor 508 is used for running the application programs stored in memory 502 to realize various functions: including the functions described with respect to FIGS. 1-4B.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing Chinese language user input during a natural language man-machine interaction, comprising:
at a device having one or more processors and memory:
storing a respective usage rule for processing a Chinese natural language user request for a computer-executable task, wherein the computer-executable task corresponds to multiple alternative natural language expressions in the Chinese language, wherein the respective usage rule comprises a respective rule string that includes the multiple alternative natural language expressions in Chinese, at least one placeholder for inserting (i) a respective named entity in the respective rule string in accordance with Chinese grammatical rules, (ii) a respective command index number that corresponds to a command to process the computer-executable task, and (iii) a respective parameter string that identifies respective types of input values to be obtained from the user request and used to process the computer-executable task;
performing a first transformation on the respective rule string of the respective usage rule to obtain a respective regular expression pattern by converting one or more Chinese characters in the respective rule string into a first identifier, wherein the first identifier includes a regular expression for a respective string;
performing a second transformation on the respective rule string of the respective usage rule to obtain a respective standard regular expression by adding a second identifier immediately before the at least one placeholder and another instance of the second identifier immediately after the at least one placeholder in the respective rule string, wherein:
the second identifier includes a regular expression for a wildcard;
the respective regular expression pattern obtained from the respective rule string is different from the respective standard regular expression obtained from the respective rule string, and
the respective regular expression pattern obtained through the first transformation is the same as the respective standard regular expression obtained through the second transformation when the respective regular expression pattern obtained through the first transformation is filled with one or more correct named entities recognized from a Chinese language user input, at respective locations in the respective regular expression pattern corresponding to the at least one placeholder specified in the respective rule string;
receiving a speech input from a user using a microphone installed in the device;
converting the speech input into a Chinese text string through speech-to-text processing as a first text input in Chinese;
in accordance with a determination that the first user input in Chinese matches at least one of the multiple alternative natural language expressions in the respective rule string of the respective usage rule;
obtaining a concatenated parameter string using the respective regular expression pattern of the respective usage rule obtained through the first transformation and the respective standard regular expression of the respective usage rule obtained through the second transformation, including:
extracting one or more named entities from the first user input in Chinese; and
inserting the one or more named entities recognized from the first user input at locations of corresponding parameters in the concatenated parameter string of the respective usage rule; and
performing the computer-executable task by executing the command corresponding to the respective command index number using the concatenated parameter string and producing a result from the execution of the command.

2. The method of claim 1, wherein obtaining the concatenated parameter string using the respective regular expression pattern and the respective standard regular expression further comprises:
in accordance with a determination that the first user input matches the respective rule string of the respective usage rule, extracting a respective intermediate parameter from the first user input in accordance with the respective regular expression pattern, the extracting leaving a remainder portion of the first user input;
performing named entity recognition for the respective intermediate parameter to obtain at least one named entity result;
generating at least one intermediate result by concatenating the recognized named entity result with the remainder portion of the first user input;
performing matching analysis between the at least one intermediate result and the respective standard regular expression to determine a matched named entity result; and
obtaining actual parameter values for the concatenated parameter string based on one or more respective named entities identified in accordance with the matched named entity result.

3. The method of claim 2, wherein obtaining the concatenated parameter string using the respective regular expression pattern and the respective standard regular expression further comprises:
constructing the concatenated parameter string in accordance with the respective parameter string of the respective usage rule and the one or more respective named entities identified in accordance with the matched named entity result.

4. The method of claim 2, wherein performing the first transformation on the respective rule string of the respective usage rule to obtain the respective regular expression pattern further comprises:

identifying content between a first parameter and a second parameter in the respective rule string of the respective usage rule; and generating the respective regular expression pattern for the respective usage rule by substituting the content between the first parameter and the second parameter with the first identifier.

5. The method of claim 4, wherein extracting the respective intermediate parameter from the first user input in accordance with the respective regular expression pattern further comprises:

extracting the respective intermediate parameter from the first user input at a location indicated by the first identifier.

6. The method of claim 2, wherein performing the second transformation on the respective rule string of the respective usage rule to obtain the respective standard regular expression further comprises:

identifying all parameters in the respective rule string of the respective usage rule; and generating the respective standard regular expression for the respective usage rule by inserting the second identifier before and after each parameter identified in the respective rule string of the respective usage rule.

7. The method of claim 6, wherein performing the matching analysis between the at least one intermediate result and the respective standard regular expression further comprises:

determining whether each of the at least one intermediate result matches the respective standard regular expression; and in accordance with a determination that a respective one of the at least one intermediate result matches the respective standard regular expression, using the respective intermediate result as the matched intermediate result.

8. The method of claim 1, further comprising:

storing a plurality of usage rules each having a respective priority level; and processing the first user input against respective regular expression patterns of the plurality of usage rules in an order according to descending priority levels of the plurality of usage rules to determine whether the first user input matches the respective regular expression pattern of the respective usage rule.

9. A system of processing user input, comprising:

one or more processors; and memory having instructions stored thereon, the instructions, when executed by the one or more processors, cause the processors to perform operations comprising:

storing a respective usage rule for processing a Chinese natural language user request for a computer-executable task, wherein the computer-executable task corresponds to multiple alternative natural language expressions in the Chinese language, wherein the respective usage rule comprises a respective rule string that includes the multiple alternative natural language expressions in Chinese, at least one placeholder for inserting a respective named entity in the respective rule string in accordance with Chinese grammatical rules, a respective command index number that corresponds to a command to process the computer-executable task, and a respective parameter string that identifies respective types of input values to be obtained from the user request and used to process the computer-executable task;

performing a first transformation on the respective rule string of the respective usage rule to obtain a respective regular expression pattern by converting one or more Chinese characters in the respective rule string into a first identifier, wherein the first identifier includes a regular expression for a respective string;

performing a second transformation on the respective rule string of the respective usage rule to obtain a respective standard regular expression by adding a second identifier immediately before the at least one placeholder and another instance of the second identifier immediately after the at least one placeholder in the respective rule string, wherein:

the second identifier includes a regular expression for a wildcard;

the respective regular expression pattern obtained from the respective rule string is different from the respective standard regular expression obtained from the respective rule string, and the respective regular expression pattern obtained through the first transformation is the same as the respective standard regular expression obtained through the second transformation when the respective regular expression pattern obtained through the first transformation is filled with one or more correct named entities recognized from a Chinese language user input, at respective locations in the respective regular expression pattern corresponding to the at least one placeholder specified in the respective rule string;

receiving a speech input from a user using a microphone installed in the device;

converting the speech input into a Chinese text string through speech-to-text processing as a first text input in Chinese;

in accordance with a determination that the first user input in Chinese matches at least one of the multiple alternative natural language expressions in the respective rule string of the respective usage rule;

obtaining a concatenated parameter string using the respective regular expression pattern of the respective usage rule obtained through the first transformation and the respective standard regular expression of the respective usage rule obtained through the second transformation, including:

extracting one or more named entities from the first user input in Chinese; and inserting the one or more named entities recognized from the first user input at locations of corresponding parameters in the concatenated parameter string of the respective usage rule; and performing the computer-executable task by executing the command corresponding to the respective command index number using the concatenated parameter string and producing a result from the execution of the command.

10. The system of claim 9, wherein obtaining the concatenated parameter string using the respective regular expression pattern and the respective standard regular expression further comprises:

in accordance with a determination that the first user input matches the respective rule string of the respective usage rule, extracting a respective intermediate parameter from the first user input in accordance with the respective regular expression pattern, the extracting leaving a remainder portion of the first user input;

performing named entity recognition for the respective intermediate parameter to obtain at least one named entity result;
generating at least one intermediate result by concatenating the recognized named entity result with the remainder portion of the first user input;
performing matching analysis between the at least one intermediate result and the respective standard regular expression to determine a matched named entity result; and
obtaining actual parameter values for the concatenated parameter string based on one or more respective named entities identified in accordance with the matched named entity result.

11. The system of claim 10, wherein obtaining the concatenated parameter string using the respective regular expression pattern and the respective standard regular expression further comprises:
constructing the concatenated parameter string in accordance with the respective parameter string of the respective usage rule and the one or more respective named entities identified in accordance with the matched named entity result.

12. The system of claim 10, wherein performing the first transformation on the respective rule string of the respective usage rule to obtain the respective regular expression pattern further comprises:
identifying content between a first parameter and a second parameter in the respective rule string of the respective usage rule; and
generating the respective regular expression pattern for the respective usage rule by substituting the content between the first parameter and the second parameter with the first identifier.

13. The system of claim 12, wherein extracting the respective intermediate parameter from the first user input in accordance with the respective regular expression pattern further comprises:
extracting the respective intermediate parameter from the first user input at a location indicated by the first identifier.

14. The system of claim 10, wherein performing the second transformation on the respective rule string of the respective usage rule to obtain the respective standard regular expression further comprises:
identifying all parameters in the respective rule string of the respective usage rule; and
generating the respective standard regular expression for the respective usage rule by inserting the second identifier before and after each parameter identified in the respective rule string of the respective usage rule.

15. The system of claim 14, wherein performing the matching analysis between the at least one intermediate result and the respective standard regular expression further comprises:
determining whether each of the at least one intermediate result matches the respective standard regular expression; and
in accordance with a determination that a respective one of the at least one intermediate result matches the respective standard regular expression, using the respective intermediate result as the matched intermediate result.

16. The system of claim 9, wherein the operations further comprise:
storing a plurality of usage rules each having a respective priority level; and
processing the first user input against respective regular expression patterns of the plurality of usage rules in an order according to descending priority levels of the plurality of usage rules to determine whether the first user input matches the respective regular expression pattern of the respective usage rule.

17. A non-transitory computer-readable medium having instructions stored thereon, the instructions, when executed by one or more processors, cause the processors to perform operations comprising:
storing a respective usage rule for processing a Chinese natural language user request for a computer-executable task, wherein the computer-executable task corresponds to multiple alternative natural language expressions in the Chinese language, wherein the respective usage rule comprises a respective rule string that includes the multiple alternative natural language expressions in Chinese, at least one placeholder for inserting (i) a respective named entity in the respective rule string in accordance with Chinese grammatical rules, (ii) a respective command index number that corresponds to a command to process the computer-executable task, and (iii) a respective parameter string that identifies respective types of input values to be obtained from the user request and used to process the computer-executable task;
performing a first transformation on the respective rule string of the respective usage rule to obtain a respective regular expression pattern, by converting one or more Chinese characters in the respective rule string into a first identifier, wherein the first identifier includes a regular expression for a respective string;
performing a second transformation on the respective rule string of the respective usage rule to obtain a respective standard regular expression by adding a second identifier immediately before the at least one placeholder and another instance of the second identifier immediately after the at least one placeholder in the respective rule string, wherein:
the second identifier includes a regular expression for a wildcard;
the respective regular expression pattern obtained from the respective rule string is different from the respective standard regular expression obtained from the respective rule string, and
the respective regular expression pattern obtained through the first transformation is the same as the respective standard regular expression obtained through the second transformation when the respective regular expression pattern obtained through the first transformation is filled with one or more correct named entities recognized from a Chinese language user input, at respective locations in the respective regular expression pattern corresponding to the at least one placeholder specified in the respective rule string;
receiving a speech input from a user using a microphone installed in the device;
converting the speech input into a Chinese text string through speech-to-text processing as a first text input in Chinese;
in accordance with a determination that the first user input in Chinese matches at least one of the multiple alternative natural language expressions in the respective rule string of the respective usage rule;
obtaining a concatenated parameter string using the respective regular expression pattern of the respective usage rule obtained through the first transformation and the respective standard regular expression of the respective usage rule obtained through the second transformation, including:
  extracting one or more named entities from the first user input in Chinese; and
  inserting the one or more named entities recognized from the first user input at locations of corresponding parameters in the concatenated parameter string of the respective usage rule; and
performing the computer-executable task by executing the command corresponding to the respective command index number using the concatenated parameter string and producing a result from the execution of the command.

18. The computer-readable medium of claim 17, wherein obtaining the concatenated parameter string using the respective regular expression pattern and the respective standard regular expression further comprises:
  in accordance with a determination that the first user input matches the respective rule string of the respective usage rule, extracting a respective intermediate parameter from the first user input in accordance with the respective regular expression pattern, the extracting leaving a remainder portion of the first user input;
  performing named entity recognition for the respective intermediate parameter to obtain at least one named entity result;
  generating at least one intermediate result by concatenating the recognized named entity result with the remainder portion of the first user input;
  performing matching analysis between the at least one intermediate result and the respective standard regular expression to determine a matched named entity result; and
  obtaining actual parameter values for the concatenated parameter string based on one or more respective named entities identified in accordance with the matched named entity result.

* * * * *